United States Patent [19]

Belenkiy et al.

[11] Patent Number: 5,333,222
[45] Date of Patent: Jul. 26, 1994

[54] ADAPTER FOR INTERCONNECTING OPTICAL FIBER CONNECTORS OR THE LIKE

[75] Inventors: Yuriy Belenkiy, Chicago; Igor Grois, Northbrook; Ilya Makhlin, Skokie, all of Ill.

[73] Assignee: Molex Incorporated, Lisle, Ill.

[21] Appl. No.: 62,086

[22] Filed: May 14, 1993

[51] Int. Cl.⁵ .............................. G02B 6/00; G02B 6/36
[52] U.S. Cl. .................................................... 385/70
[58] Field of Search ...................... 385/53, 55, 56, 70, 385/76, 77

[56] References Cited

U.S. PATENT DOCUMENTS

| | | | |
|---|---|---|---|
| 4,526,431 | 7/1985 | Kasukawa | 339/45 R |
| 4,726,647 | 2/1988 | Kakii et al. | 350/96.21 |
| 4,960,317 | 10/1990 | Briggs et al. | 385/56 |
| 4,979,792 | 12/1990 | Weber et al. | 385/53 |
| 5,037,175 | 8/1991 | Weber | 385/76 |
| 5,121,454 | 6/1992 | Iwano et al. | 385/60 |

Primary Examiner—Akm E. Ullah
Attorney, Agent, or Firm—A. A. Tirva

[57] ABSTRACT

An adapter assembly is provided for interconnecting a pair of opposing optical fiber connectors generally along an optical axis. The adapter assembly is constructed as a double-ended receptacle for receiving the connectors in opposite open ends thereof. The assembly further includes a pair of halves each defining one of the open ends for receiving one of the connectors. Each half has an interconnection operatively associated with its respective connector. At least one latch arm is provided on one of the adapter halves, within the peripheral bounds thereof, projecting generally parallel to the optical axis toward the other adapter half and engageable with a complementary latch on the other half.

12 Claims, 2 Drawing Sheets

ADAPTER FOR INTERCONNECTING OPTICAL FIBER CONNECTORS OR THE LIKE

FIELD OF THE INVENTION

This invention generally relates to the art of connecting devices and, particularly, to an adapter for interconnecting a pair of opposing optical fiber connectors such as SC-type connectors.

BACKGROUND OF THE INVENTION

Optical fibers are used for high speed communications and data transmissions. Optical fiber connectors are used on opposing fiber ends to provide means for readily coupling and uncoupling the fiber ends in a quick-release fashion. Rather than providing male (plug) and female (receptacle) connectors as is prevalent in the electrical connector art, optical fiber connectors often are interconnected by adapters which not only interconnect a pair of opposing optical fiber connectors, but the adapters facilitate aligning the optical fibers to prevent transmission losses at any given interconnecting interface.

One type of optical fiber connector design commonly is identified as an "ST" connector ("ST" being a trademark of American Telephone and Telegraph Co.). Such connectors generally are of a bayonet-type interconnection. Basically, this type of connection includes a plug-type coupling having one or more outwardly projecting lugs, along with a relatively rotatable socket-type coupling having a spiral or L-shaped slot for respectively receiving each of the lugs. When an adapter is used, the bayonet-type plug couplings or connectors are terminated to opposing optical fiber ends, and the adapter has opposite receptacle ends provided with lug-receiving slots for receiving the opposing optical fiber couplings or connectors.

Another type of optical fiber connector design commonly is identified as an "SC" connector, first manufactured by Nippon Telegraph and Telephone Co. of Japan. Generally, this type of interconnection is based on a push-pull concept. Again, plug-type couplings or connectors are terminated to opposing optical fiber ends. When an adapter is used, it again is designed as a double-ended receptacle for receiving the opposing optical fiber connectors, but in a push-pull fashion. The connectors and the adapter have complementary interengaging latch means, such as hooked latch arms for engaging latch bosses, to interconnect the adapter and the connectors.

One of the problems with adapter designs heretofore available, whether used with ST, SC or other fiber optic connectors, is that the adapters are fabricated with two interconnected halves. Each half defines one receptacle end of the adapter for receiving a respective one of the opposing optical fiber connectors. Consequently, some form of means must be provided for joining or interconnecting the adapter halves. Most often, the adapter halves are provided with radially outwardly extending flanges which are abuttingly engaged, and fasteners (such as rivets) are used to rigidly join the flanges outside the bounds of the adapter body defined by the two halves thereof. Such flanges take up valuable "real estate" in compact or tight interconnection environments, and the use of such fasteners as rivets require additional and expensive manufacturing steps. In addition, such means for joining the adapter halves are not easy to assemble in the field.

Another problem with such adapters is that they often are used in conjunction with a panel. For instance, an adapter may be located in an aperture in a panel, and a pair of opposing optical fiber connectors thereby can be interconnected from opposite sides of the panel into the mounted adapter. Heretofore, separate mounting means, such as metal clips, have been used on adapters to mount the adapters in a panel. Again, such separate components are not cost effective and are not favorable in field use.

This invention is directed to solving the problems encountered with adapters of the character described above, particularly those problems identified above, and to satisfy a need for a simple, cost-effective and easy to use adapter design.

SUMMARY OF THE INVENTION

An object, therefore, of the invention is to provide a new and improved adapter for interconnecting a pair of opposing optical fiber connectors.

In the exemplary embodiment of the invention, the adapter is constructed as a double-ended receptacle for receiving the connectors, generally along an optical axis, in opposite open ends of the adapter. The adapter further includes a pair of halves each defining one of the open ends for receiving one of the connectors. Each half has interconnecting means associated with its respective connector. The invention contemplates that complementary interengaging latch means be provided between the adapter halves in the form of at least one latch arm on one of the adapter halves projecting generally parallel to the optical axis toward the other adapter half and engageable with a complementary latch on the other half. As disclosed herein, the latch arm on the one adapter half has a hooked latch portion for interengaging a latch shoulder on the other adapter half. The halves are molded of dielectric material, such as plastic or the like, and the latch arm, thereby, is resilient to snappingly engage the latch shoulder.

In the preferred embodiment of the invention, the latch arm is located at an outer peripheral face of the one adapter half. Preferably, the latch arm is located within the transverse bounds of the outer peripheral face of the one adapter half. Still further, the latch arm preferably has an outer peripheral face generally flush with the outer peripheral face of the one adapter half. The latch arm is insertable in a recessed area in an outer peripheral face of the other adapter half, and the complementary latch on the other adapter half is located in the recessed area.

As disclosed herein, the adapter halves each have one of the latch arms engageable with a complementary latch on the other half. When assembled, one latch arm and its respective latch are located on each of a pair of opposite sides of the adapter.

Another feature of the invention is the provision of a deformable rib on the outside of the adapter. The rib is engageable with an inner peripheral edge of an aperture in a panel and provides the sole means for mounting the adapter in the panel aperture.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
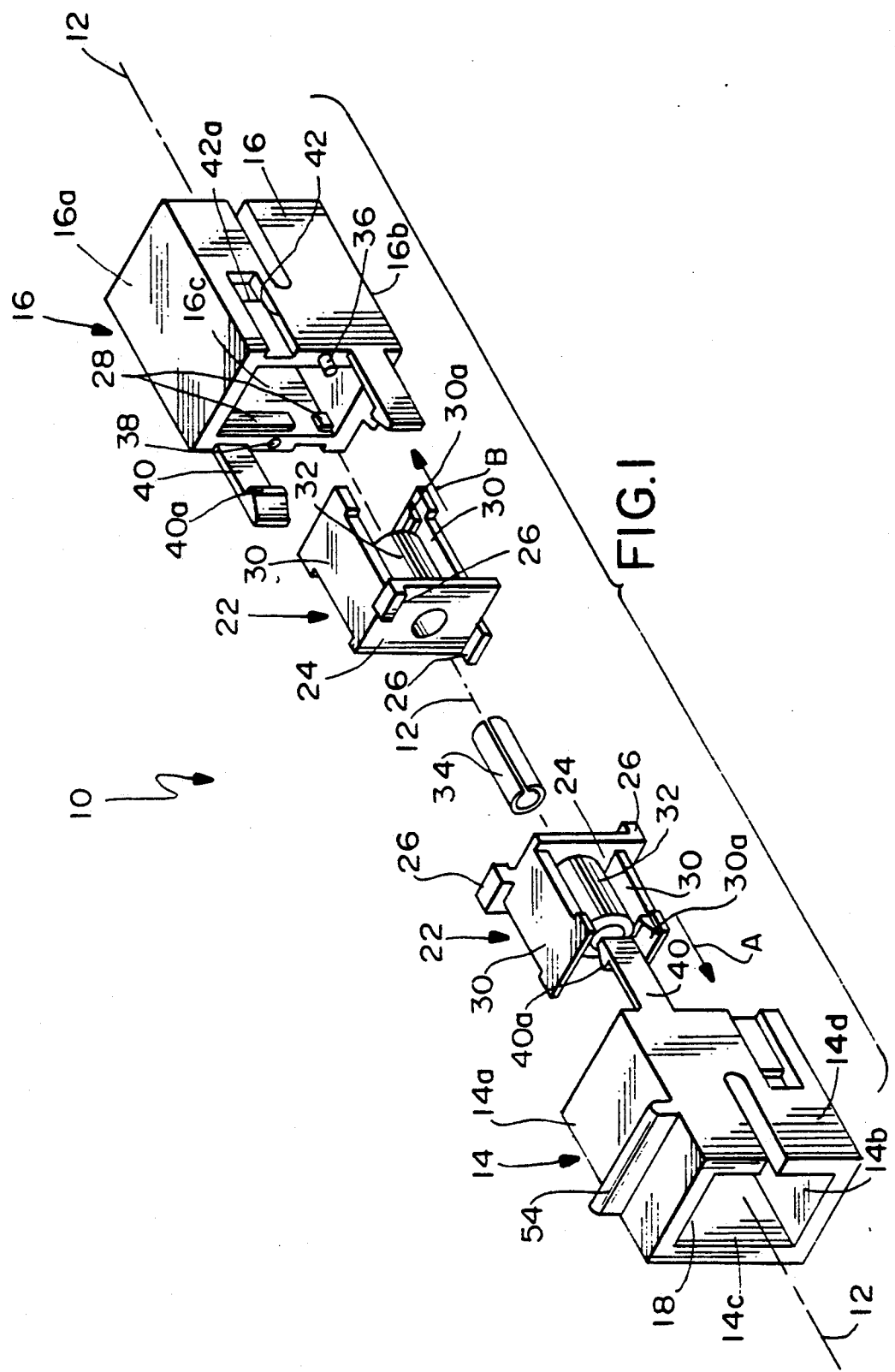
FIG. 1 is an exploded perspective view of the adapter assembly of the invention.

Referring to the drawings in greater detail, the invention is embodied in an adapter assembly, generally designated 10, for interconnecting a pair of opposing optical fiber connectors generally along an optical axis 12. The interconnectable optical fiber connectors are not shown, but it should be understood that such connectors are well known in the art and are commonly identified as "SC" connectors as fully described in the "Background", above. Generally, the adapter assembly is constructed as a double-ended receptacle for receiving the connectors in opposite open ends thereof. The adapter assembly includes a pair of adapter halves, generally designated 14 and 16, each defining one of the open ends for receiving one of the optical fiber connectors.

More particularly, adapter half 14 includes an open end 18 for receiving one of the pair of opposing optical fiber connectors, and adapter half 16 has an open end 20 for receiving the other of the pair of opposing optical fiber connectors. In essence, the open ends define receptacles for the plug-type connectors in a push-pull fashion.

Each adapter half 14 and 16 mounts an insert, generally designated 22, therewithin. The inserts are substantially identically constructed. In other words, if the right-hand insert 22 shown in FIG. 1 for adapter half 16 is turned 180° relative to axis 12, it would be substantially identical in construction and orientation to that depicted by insert 22 for adapter half 14. Therefore, only one of the inserts will be described below.

Figure 3:
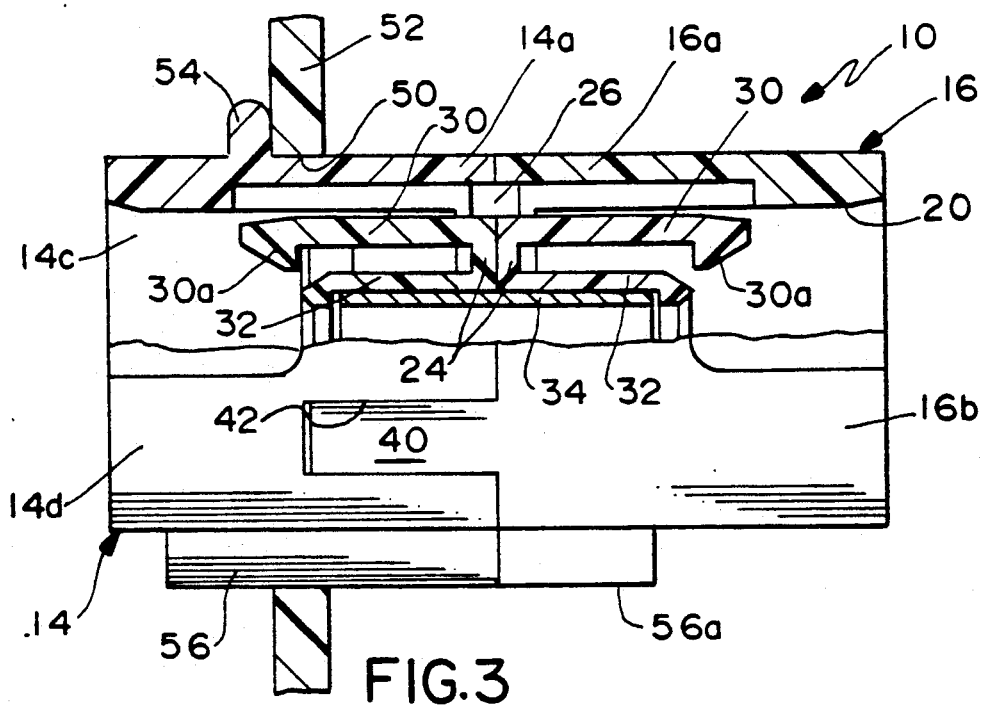
FIG. 3 is a partial vertical section taken generally along line 3—3 of FIG. 2.

Each insert 22 includes an inner plate portion 24 for abutting the plate portion of the other insert when in assembled condition as shown in FIG. 3. Lugs 26 project from plates 24 to overlie the edges of the plate of the opposite insert to facilitate axially aligning the inserts. In addition, the left-hand insert is assembled into adapter half 14 in the direction of arrow "A" (FIG. 1), and the right-hand insert is assembled into adapter half 16 in the direction of arrow "B". Lugs 26 abut against interior shoulder means 28 (see adapter half 16 in FIG. 1) to rigidly lock the inserts in abutting relationship within the adapter halves when in fully assembled condition as shown in FIG. 3.

Inserts 22 are unitarily molded of dielectric material such as plastic or the like, and each insert includes a pair of connecting arms 30 projecting axially toward the respective end of its adapter half. Connecting arms 30 include hook portions 30a for interconnection with appropriate latch means on the optical fiber connectors as is known in the art with push-pull SC connectors. Each insert further includes an integral, axially outwardly directed cylindrical boss portion 32 for receiving one end of a sleeve 34. In other words, sleeve 34 spans both inserts within cylindrical boss portions 32 as seen in FIG. 3. The sleeve is effective to axially align the fiber ferrules of the opposing optical fiber connectors.

Except for the panel-mounting means which will be described hereinafter, adapter halves 14 and 16 are of substantially identical construction and function, except for their 180° opposite orientation in assembly as shown in the drawings. Therefore, adapter half 16 will be described in detail, below, with the suffix "a" being used in conjunction with the reference numeral 14 to indicate identical corresponding components of adapter half 14.

More particularly, adapter half 16 includes a top wall 16a, a bottom wall 16b, a side wall 16c and an opposite side wall 16d which combine to provide a rectangular configuration defining open-ended receptacle 20 (FIG. 3). Each adapter half is unitarily molded of dielectric material, such as plastic or the like, and shoulders 28 (FIG. 1) are molded integrally with side walls 16c and 16d for abutting inserts 22. An alignment pin 36 projects inwardly of the inner edge of side wall 16d and a complementary mating alignment hole 38 is formed in the inner edge of opposite side wall 16c for interengagement with an identical alignment pin and hole of side walls 14c and 14d of adapter half 14.

The invention contemplates a unique complementary interengaging latch means between adapter halves 14 and 16 to eliminate any projections extending outwardly from the adapter assembly, such as the attachment flanges of the prior art. More particularly, a flexible latch arm 40 projects axially inwardly from the edge of each side wall of each adapter half 14 and 16. In essence, the side walls of the adapter halves define outer peripheral faces, and it can be seen clearly in FIG. 1 that the outsides or outer peripheral faces of the latch arms are flush with the outer peripheral faces of the side walls of the adapter halves. In fact, looking at the end view of FIG. 2, the latch arms cannot even be seen. Therefore, the latch arms are contained entirely within the transverse bounds of the adapter assembly and do not project outwardly therefrom. Each adapter half has a complementary recessed area 42 to accommodate a respective one of the latch arms 40 and, thereby, maintain the latch arms within the peripheral bounds of the adapter. The outer distal ends of the latch arms are provided with chamfered latch hooks 40a, and each recessed area 42 is provided with a complementary latch shoulder 42a for snappingly receiving hooks 40a.

Figure 2:
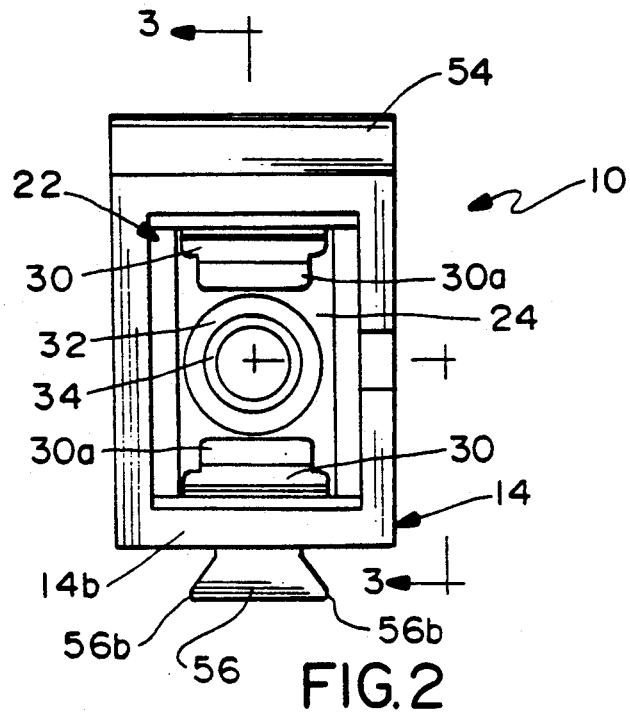
FIG. 2 is an end elevational view of the adapter assembly.

In assembly, when adapter halves 14 and 16, along with their respective inserts 22 and sleeve 34, are assembled from the condition shown in FIG. 1 to the assembled condition shown in FIG. 3, latch arms 40a of each adapter half enters a respective one of the recessed areas 42 of the other adapter half. Chamfered latch hooks 40a resiliently bias the latch arms radially outwardly until the hooks snap back inwardly into engagement with latch shoulders 42a.

Lastly, FIG. 3 shows adapter assembly 10 mounted in an aperture 50 in a panel 52. Adapter half 14 includes a transverse lip 54 for abutting against one side of panel 52 to define a mounted position of adapter assembly 10. The invention contemplates a feature for eliminating the extraneous panel mounting clips of the prior art. Specifically, an axially extending, integrally molded rib 56 projects from the bottom of adapter half 14. As seen in FIG. 3, an aligned extended portion 56a of the rib also is provided on the bottom of adapter half 16. Referring back to FIG. 2, rib 56 can be seen to be dove-tailed in configuration to define acutely pointed corners 56b. With the adapter halves being molded of plastic material, these acute or pointed corners are readily deformable upon insertion into an appropriately dimensioned panel aperture to provide an interference fit and, thereby, secure the adapter assembly within the panel aperture without the use of any extraneous mounting clips or other hardware.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In an adapter assembly for interconnecting a pair of opposing optical fiber connectors generally along an optical axis, the adapter assembly being constructed as a double-ended receptacle for receiving the connectors in opposite open ends thereof, the adapter assembly further including a pair of halves each defining one of said open ends for receiving one of the connectors, and each half having interconnecting means operatively associated with its respective connector, wherein the improvement comprises complementary interengaging latch means between the adapter halves in the form of at least one latch arm on one of the adapter halves projecting generally parallel to said axis toward the other adapter half and engageable with a complementary latch on the other half, and wherein at least one of the adapter halves includes a deformable rib engageable with an inner peripheral edge of an aperture in a panel and providing the sole means for mounting the adapter in the aperture in the panel.

2. In an adapter assembly as set forth in claim 1, wherein said latch arm on the one adapter half has a hooked latch portion for interengagement with a latch shoulder on the other adapter half.

3. In an adapter assembly as set forth in claim 1, wherein said latch arm is located at an outer peripheral face of the one adapter half.

4. In an adapter assembly as set forth in claim 3, wherein said latch arm is located within the transverse bounds of said outer peripheral face.

5. In an adapter assembly as set forth in claim 4, wherein said latch arm has an outer peripheral face generally flush with the outer peripheral face of the one adapter half.

6. In an adapter assembly as set forth in claim 5, wherein said latch arm is insertable in a recessed area in an outer peripheral face of the other adapter half.

7. In an adapter assembly as set forth in claim 6, wherein said complementary latch on the other adapter half is located in said recessed area.

8. In an adapter assembly as set forth in claim 7, wherein said latch arm on the one adapter half has a hooked latch portion for interengagement with a latch shoulder on the other adapter half.

9. In an adapter assembly as set forth in claim 1, wherein the adapter halves and their respective interconnecting means are of molded plastic material.

10. In an adapter for interconnecting a pair of opposing optical fiber connectors generally along an optical axis, the adapter being constructed as a double-ended receptacle for receiving the connectors in opposite open ends thereof, and the adapter including an outer peripheral wall of molded plastic material, wherein the improvement comprises an integral deformable rib projecting outwardly of the outer wall and engageable with an inner peripheral edge of an aperture in a panel and providing the sole means for mounting the adapter in the aperture in the panel.

11. In an adapter as set forth in claim 10, wherein said deformable rib is elongated and extends axially of the adapter.

12. In an adapter as set forth in claim 11, wherein said deformable rib has a dove-tail cross-section to provide acute corners which are readily deformable.

* * * * *